United States Patent [19]

Monsarrat et al.

[11] 4,268,221
[45] May 19, 1981

[54] COMPRESSOR STRUCTURE ADAPTED FOR ACTIVE CLEARANCE CONTROL

[75] Inventors: William G. Monsarrat; William F. Neal, both of South Windsor, Conn.

[73] Assignee: United Technologies Corporation, Hartford, Conn.

[21] Appl. No.: 24,636

[22] Filed: Mar. 28, 1979

[51] Int. Cl.³ .............................................. F02C 7/16
[52] U.S. Cl. .................................. 415/116; 415/175; 60/727
[58] Field of Search ................. 60/726, 727; 415/115, 415/116, 175

[56] References Cited

U.S. PATENT DOCUMENTS

| | | | |
|---|---|---|---|
| 3,451,215 | 6/1969 | Barr | 415/116 |
| 3,777,489 | 12/1973 | Johnson et al. | 60/726 |
| 4,034,558 | 7/1977 | Korta et al. | 60/726 |
| 4,069,662 | 1/1978 | Redinger et al. | 415/116 |

Primary Examiner—Robert E. Garrett
Attorney, Agent, or Firm—Robert C. Walker

[57] ABSTRACT

A compressor structure for a gas turbine engine capable of enhanced active clearance control within the compressor is disclosed. Various construction details which enable the discharge of cooling air against the compressor case and which minimize thermal distortion of the case are developed. The concepts are applied to a longitudinally split compressor case and include an external bleed manifold of circular cross section which extends across the longitudinal split in the case. Cooling air is dischargeable beneath the manifold to cool the case structure. Heat shields are provided in access ports to the manifold to inhibit heat transfer to the compressor case at the local regions of the ports.

3 Claims, 5 Drawing Figures

U.S. Patent May 19, 1981 Sheet 3 of 3 4,268,221
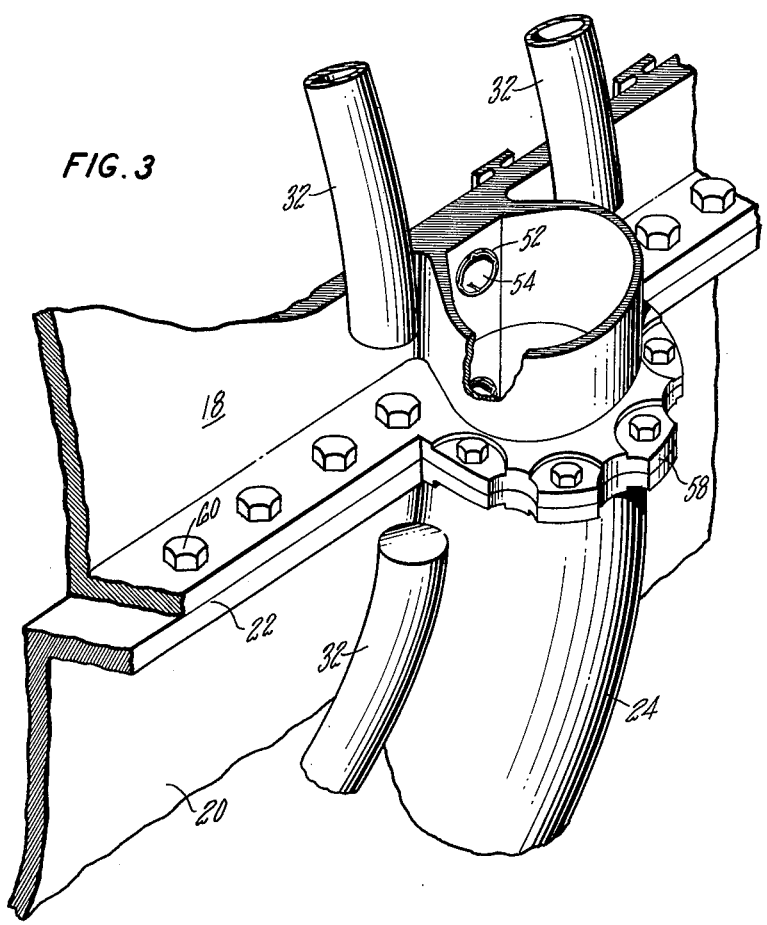
FIG. 3
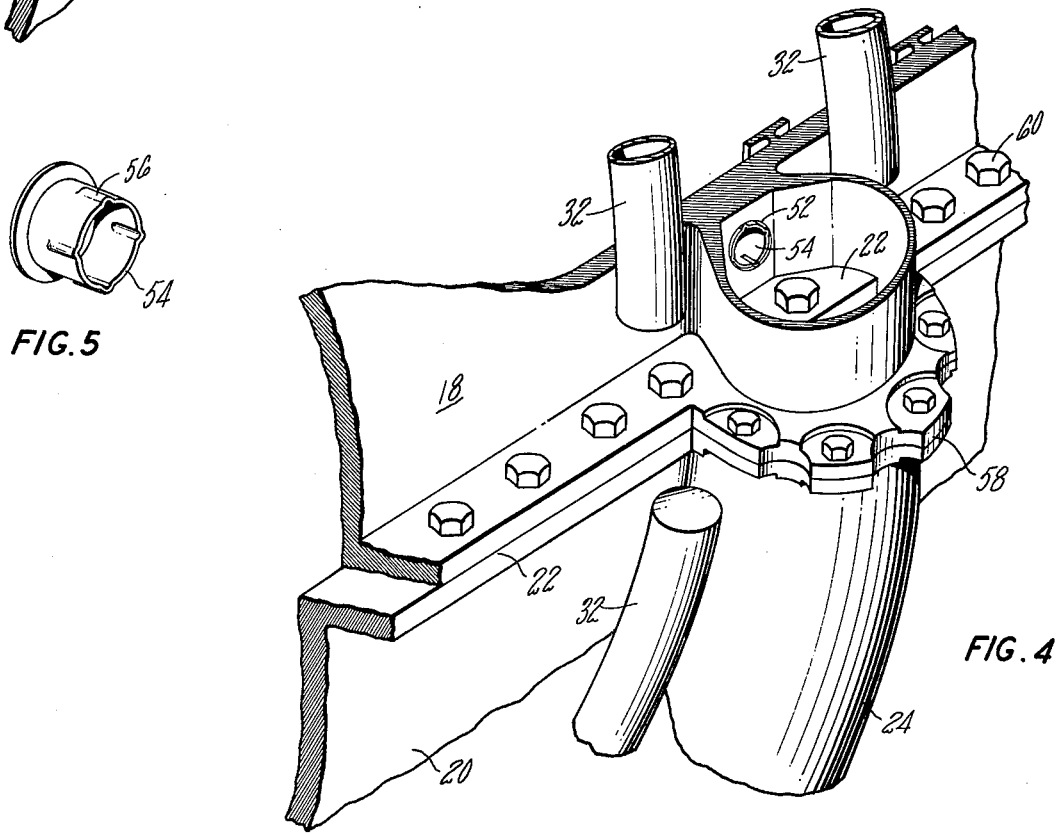
FIG. 5
FIG. 4

COMPRESSOR STRUCTURE ADAPTED FOR ACTIVE CLEARANCE CONTROL

BACKGROUND OF THE INVENTION

1. Field of the Invention

This invention relates to engine case structures of gas turbine engines, and specifically to compressor structures for use in conjunction with active control of clearances within an engine.

2. Description of the Prior Art

In a gas turbine engine of the type referred to above, working medium gases are pressurized in a compression section by a first series of rotor mounted blades and are flowed axially downstream to a combustion section. Fuel is combined with the pressurized gases and burned in the combustion section to add thermal energy to the flowing medium. In a turbine section downstream of the combustion section, the medium gases are flowed across a second series of rotor mounted blades. The second series of blades extracts energy from the flowing gases to drive the blades of the compression section.

In an axial flow engine the blades of the compression and turbine sections are arranged in rows which extend radially outwardly across the medium flowpath from an engine rotor. An essentially cylindrical case circumscribes the tips of the rotor blades. Vanes extend inwardly from the case between each pair of adjacent blade rows to direct the medium gases to a preferred angle of attack approaching each downstream blade row. Compression sections and turbine sections are formed by one of two construction techniques. In accordance with the first technique, rows of blades and vanes are assembled in alternating sequence within a cylindrical engine case. In the second technique, the cylindrical case is longitudinally split into a top and bottom segment. The blades are assembled onto the rotor and the vanes are assembled into the case segments. The case segments are then joined about the rotor to form the alternating blade and vane structure. The split case construction is illustrated, for example, in U.S. Pat. No. 2,848,156 to Oppenheimer entitled "Fixed Stator Vane Assemblies". The rows of stator vanes are assembled in the appropriate top or bottom segments such that when the top and bottom segments are joined, the rows of stator vanes will be alternatingly positioned between rows of rotor blades. Split case constructions afford ease of assembly and maintenance when compared to one piece, cylindrical cases.

The pressurized air of the compression section is utilized for providing aircraft services and for cooling applications within the turbine section of the engine itself. Additionally, substantial amounts of the pressurized air are bled from the compressor section to enhance starting characteristics and to decrease the sensitivity of the compressor to surge or stall phenomenon during operation. Manifolds collecting bleed air for these purposes are constructed about the compressor section of the engine. U.S. Pat. No. 3,597,106 to Anderson entitled "Combination Compressor Casing-Air Manifold Structure", for example, illustrates such a manifold which is contained entirely within the longitudinal split engine case.

In addition to the internal manifold of the type illustrated by Anderson, manifold structures are also known to be constructed externally of the engine case. When incorporated in longitudinally split case structures, however, external manifolds of the prior art are regional in nature and are not known to extend across the longitudinal split in the case. Regional manifolds are suitable for use where the temperature of the engine case is maintained at a near uniform level. Where deviations in case temperature are expected, the regional manifolds cause undesirable distortion of the case and attendant increases in clearance between the rotor and stator structures. If adequate initial clearance is not provided between the rotor and stator elements, destructive interference between such parts may also result.

Engine operating efficiency is largely dependent upon maintaining minimum clearances between the rotor and stator elements of the engine flowpath. For example, any clearance between the tips of the rotor blades and outer air seals of the engine case has a strongly negative effect on compression efficiency. Notwithstanding, the clearance must be sufficiently large to accommodate radial displacement of the rotor blade tips during acceleration of the engine as the temperature of the working medium gases increases. In response to increased temperature, the blades instantaneously expand in the spanwise direction outwardly toward the outer air seal. The outer air seal, however, responds with the compressor case from which it is supported at a much slower rate. Substantial initial clearance between the blade tips and the shroud is provided in the cold condition to prevent destructive impact of the blades on the shroud as the engine is accelerated and the flowpath temperatures increase. Unfortunately as thermally stable conditions are reached, the case and the outer air seal which is supported therefrom grow radially away from the blades leaving again a substantial clearance which approximates the initial clearance.

Recently developed active techniques for reducing the clearance between the rotor and stator elements at equilibrium conditions, are taught in U.S. Pat. Nos. 4,019,320 to Redinger et al entitled "External Gas Turbine Engine Cooling for Clearance Control" and 4,069,662 to Redinger et al entitled "Clearance Control for a Gas Turbine Engine". In such techniques, cooling air is flowed over the engine case to reduce the case diameter at equilibrium conditions such that the radial clearance between the rotor and stator elements is reduced to an acceptable minimum. The cooling techniques of the Redinger et al patents were developed primarily for one piece cylindrical cases and have yet to be successfully applied to the compression sections of engines employing longitudinally split compressor case structure.

The combination of active clearance control techniques into longitudinally split compressor structures presents several problems to which the concepts of the present invention are directed.

SUMMARY OF THE INVENTION

A primary aim of the present invention is to provide a compressor structure for engines incorporating active clearance control techniques. Suitability of the resultant structure for use with a longitudinally split compressor case is sought, and specific objects are to provide a bleed manifold of nearly uniform cross section which is capable of reducing thermal deformation of the case and means for flowing bleed air into the manifold without causing severe thermal gradients in the case material.

In accordance with the present invention, a longitudinally split compressor case has an external manifold which extends circumferentially across the longitudinal split in the case and has a plurality of lined ports providing access of medium gases to the manifold.

A primary feature of the combination comprising the present invention is the compressor manifold which extends circumferentially across the longitudinal split in the compressor case. The manifold is continuous about the circumference of the case and in at least one embodiment, has a circular cross section which enables the discharge of cooling air against the case beneath the manifold for control of clearances within the engine. Ports providing access of the medium gases to the manifold are lined with a heat shielding material. In at least one embodiment a flange at the longitudinal split extends through the manifold.

A principal advantage of the combination of the present invention is reduced thermal distortion of the compressor case. Extension of the manifold across the longitudinal split in the case decreases the tendency of the case to distort at operating temperatures. Heat shields lining the access ports prevent the establishment of intolerable thermal gradients around the port areas. Extension of the manifold across the longitudinal split also minimizes the required cross sectional area of a bleed manifold and enables flexibility in the placement of bleed ports. The circular cross section geometry of the manifold reduces the minimum thickness required in the material from which the manifold is fabricated and enables the discharge of cooling air against the case beneath the manifold for control of clearances within the engine.

The foregoing, and other objects, features and advantages of the present invention will become more apparent in the light of the following detailed description of the preferred embodiment thereof as shown in the accompanying drawing.

BRIEF DESCRIPTION OF THE DRAWING

FIG. 3 is a partial perspective view including cutaway portions of a bleed manifold in the region of the longitudinal split in the case;

FIG. 4 is a view corresponding to the FIG. 3 view showing an alternate construction; and FIG. 5 is a perspective view showing the heatshield construction.

DETAILED DESCRIPTION

Figure 1:
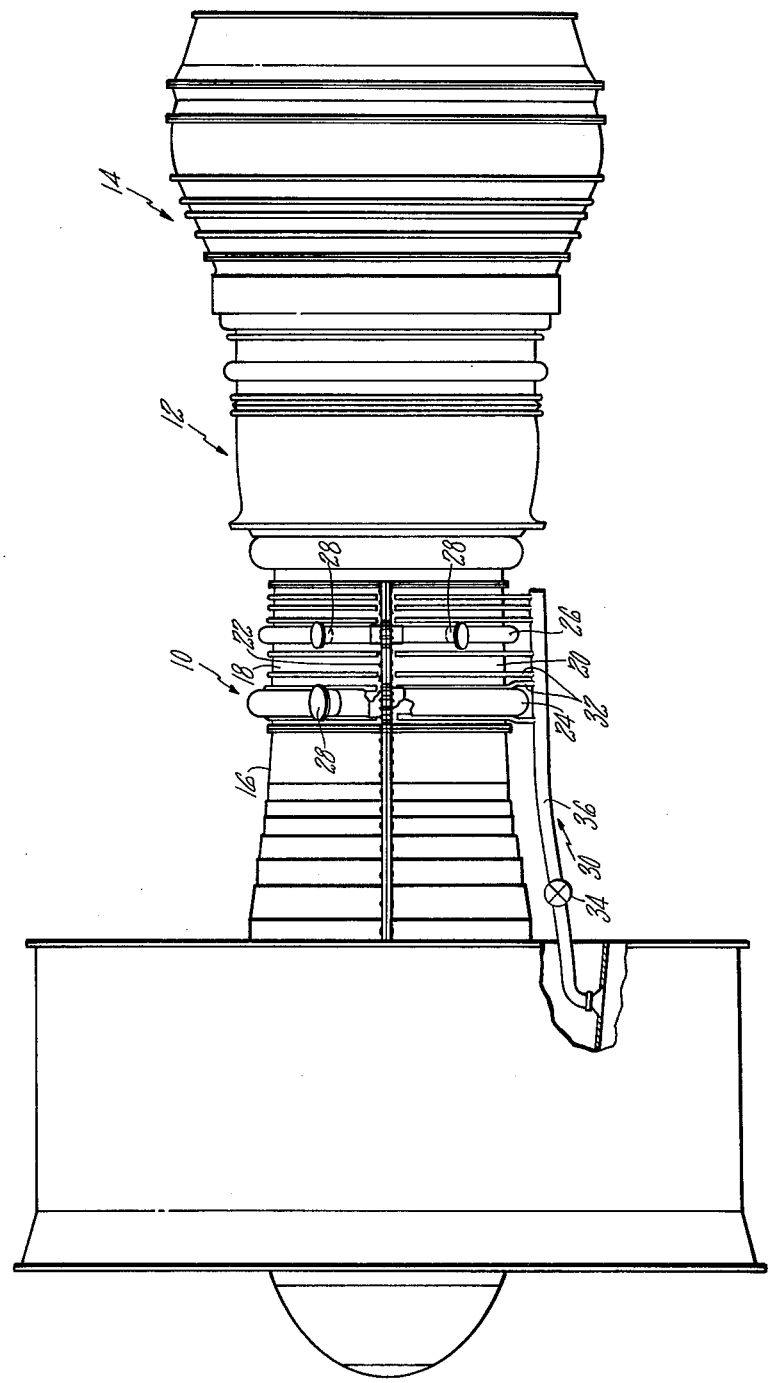
FIG. 1 is a simplified, side elevation view of a gas turbine engine showing a longitudinal split in the compressor case structure.

The concepts of the present invention are illustrated in the turbofan, gas turbine engine embodiment of FIG. 1.

The engine illustrated has a compression section 10, a combustion section 12 and a turbine section 14. An engine caes 16 in the compression section is formed of a top segment 18 and a bottom segment 20. The top and bottom segments are joined at a longitudinal flange 22 on each side of the engine. Manifolds 24 and 26 are formed integrally with the top and bottom segments and extend circumferentially about the engine. The manifolds extend across the longitudinal flanges and are adapted to receive pressurized air from the compression section. Bleed valves 28 are located on the manifolds and are adapted to enable discharge of the pressurized air from the manifolds.

Apparatus 30 for actively controlling the diameter of the compressor case is adapted to discharge cooling air against the case. In the form illustrated a plurality of spray bars 32 having a multiplicity of discharge orifices circumscribe the case. A valve 34 in a cooling air supply line 36 opens to flow cooling air through the discharge orifices under conditions when a reduction in case diameter is desired.

Figure 2:
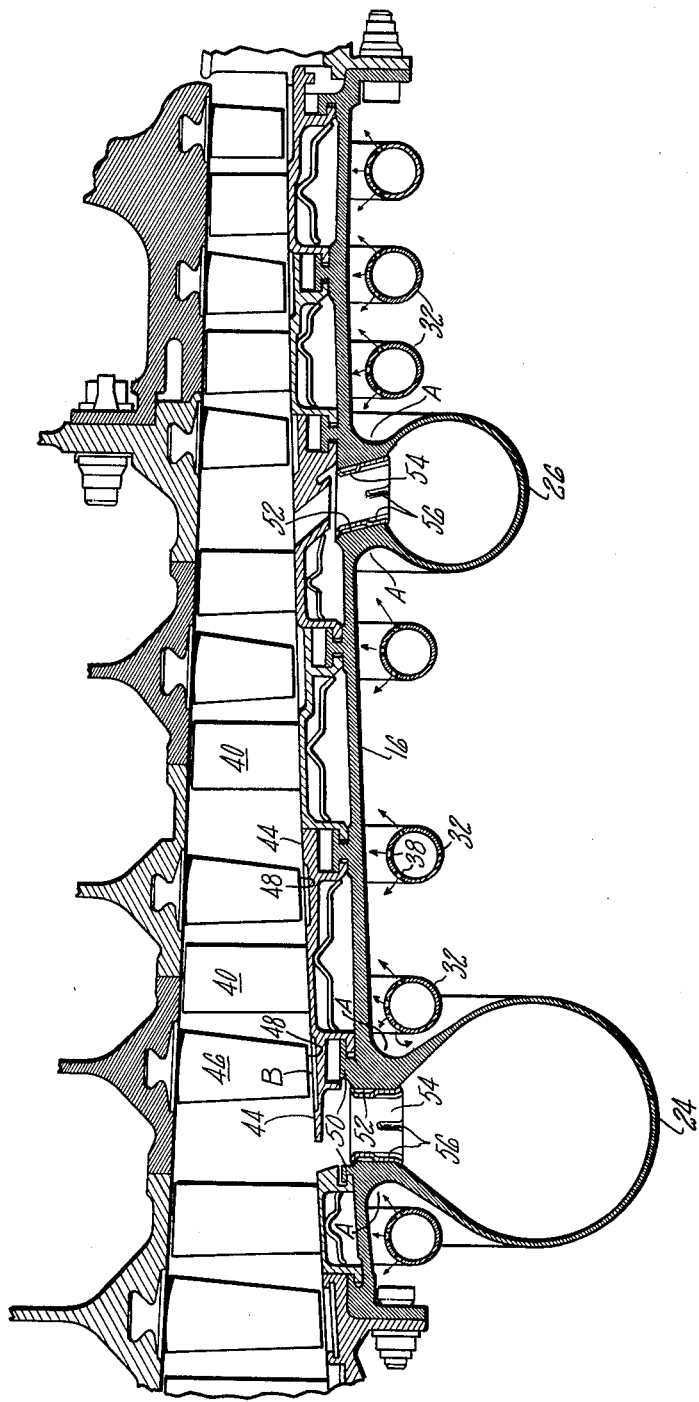
FIG. 2 is a sectional view taken through the compressor section of the engine showing the relationship between bleed manifolds and components of the active clearance control system.

The relationship between the spray bars 32 and the manifolds is shown in the FIG. 2 partial cross section view of the compressor section. Two manifolds are illustrated: a larger, starting bleed manifold 24 and a smaller, turbine cooling air bleed manifold 26. The bleed manifolds are circular in cross section and extend circumferentially about the case 16. A plurality of the spray bars 32 having discharge orifices 38 are adapted to spray cooling air against the case. The circular cross section of the manifolds enables the discharge of cooling air beneath the manifolds in the regions A.

Internally of the case a plurality of rows of case mounted vanes 40 extend across a flowpath 42 for working medium gases. Between each row of the vanes is a case mounted, outer air seal 44. A row of rotor blades 46 extends outwardly across the flowpath into proximity with each outer air seal. A radial clearance B is provided between the tip 48 of each blade and the corresponding outer air seal. The outer air seals and the stator vanes are attached to the case by circumferentially extending hooks 50.

Access of the pressurized medium of the flowpath to the manifolds 24 and 26 is gained through ports 52. A plurality of ports to each manifold are spaced circumferentially about the engine. A number of ports in the range of thirty to fifty (30–50) has been found to provide adequate flow areas without introducing excessive perturbations in the flow stream through the compression section. A greater number of ports would provide a lesser disturbance.

A bushing or liner 54 is disposed within each of the ports 52. The bushing is spaced apart from the walls of the port by dimples or ribs 56 to inhibit heat transfer from the pressurized air to the case in the port region. A spacing on the order of four to ten thousandths of an inch (0.004–0.010 in.) has been found effective.

FIGS. 3 and 4 show the relationship of the longitudinal flange 22 to the starting bleed manifold 24. In the FIG. 3 embodiment the flange 22 does not penetrate the manifold. Case blow-off loads in the manifold region are carried by the manifold flange 58 alone. In the FIG. 4 embodiment the flange 22 extends through the manifold to provide a case structure having increased axial stiffness. Resistance to case blow-off loads is enhanced by placing one or more bolts 60 in the flange 22 internally of the manifold. The bolts may be installed through the bleed valve port or other specially provided access ports.

During operation of an engine in which the above described apparatus is installed, working medium gases are pressurized by the blades 46 of the compression section. Pressure ratios between ambient conditions and the downstream end of the compression section on the order of thirty (30) are common. The total compression process is likely to raise the temperature of the medium gases to five hundred degrees Celsius (500° C.) with temperatures in the manifold regions being typically within the range of three hundred to four hundred degrees Celsius (300°-400° C.). The blades 46 are in intimate contact with the hot medium gases and respond rapidly to increasing temperature. Resultantly, the tips of the blades become displaced radially outwardly as the engine is accelerated and temperatures increase. The compressor case which supports the outer air seal about the tips of the blades is more remotely located from the medium gases and responds more slowly to increasing temperatures than do the blades. The large initial clearance B is provided between the tips of the blades and the outer air seal to accommodate the acceleration response of the blades.

Contrary to the initial clearance condition for accommodating transient growth, a minimum clearance between the blade tips and outer air seals is desired at cruise and other stable conditions. Close correspondence is provided in this described embodiment by flowing cool air against the case to reduce the diameter of the case or, alternatively, limit the diametral growth of the case. The avoidance of case distortions in the cooling process is critical to effective diameter control and is addressed principally by two aspects of the present invention. Firstly, the circular cross section of the manifolds enables discharge of cooling air beneath the manifolds into proximity with the hooks 50 of regions A. Secondly, the manifolds are extended across the longitudinal split to provide a circumferentially uniform cross section in the manifold regions. Deformation as a result of local manifolding in the prior art is avoided. Collaterally, the physical hoop of the manifold reinforces and stiffens the case to reduce distortion.

Another benefit of extending the manifolds across the longitudinal split in the case is increased flexibility in siting the bleed valves 28. Substantial cross flow within the manifold is permitted to the closest bleed port irrespective of that port location in relation to the longitudinal split. The manifold size may be reduced as a result of enabled cross flow within the manifold.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. In an axial flow gas turbine engine of the type having rotor and stator elements and wherein the stator element includes a longitudinally split compressor case, the improvement comprising:
    a compressor case having an integrally formed manifold of circular cross section extending circumferentially about the exterior of the case and across the longitudinal split in the case and having a plurality of circumferentially spaced ports extending into the manifold from the interior of the case;
    a liner extending through each of said ports for shielding the case from medium gases flowing into the manifold; and
    means for thermally controlling the diameter of the case including apparatus capable of discharging cooling air against the case beneath the circular cross section manifold.

2. The invention according to claim 1 wherein said apparatus for discharging cooling air against the case beneath the circular cross section manifold includes a tube extending circumferentially about the case in substantially parallel relationship to the manifold and having a plurality of orifices adapted to direct cooling air against the case beneath the manifold.

3. The invention according to claim 2 wherein said case has an inwardly extending hook for support of stator vanes and outer air seals within the engine case wherein said hook is located beneath the bleed manifold and is coolable by said means for discharging air against the case.

* * * * *